United States Patent
Park et al.

(10) Patent No.: US 7,333,407 B2
(45) Date of Patent: Feb. 19, 2008

(54) DEFECT AREA MANAGEMENT SYSTEM AND METHOD FOR OPTICAL STORAGE MEDIUM

(75) Inventors: Yong Cheol Park, Kyonggi-do (KR); Myong Gu Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/368,470

(22) Filed: Mar. 7, 2006

(65) Prior Publication Data
US 2006/0146676 A1 Jul. 6, 2006

Related U.S. Application Data

(60) Division of application No. 10/882,163, filed on Jul. 2, 2004, now Pat. No. 7,206,267, which is a continuation of application No. 09/345,380, filed on Jun. 30, 1999, now Pat. No. 6,771,575.

(30) Foreign Application Priority Data
Jul. 1, 1998 (KR) ............... 1998/26419

(51) Int. Cl.
*G11B 7/45* (2006.01)
(52) U.S. Cl. ................. 369/47.14; 369/53.17
(58) Field of Classification Search ....... None
See application file for complete search history.

(56) References Cited

U.S. PATENT DOCUMENTS

| 5,212,676 | A | 5/1993 | Yamabata et al. |
| 5,237,553 | A | 8/1993 | Fukushima et al. |
| 5,590,349 | A | 12/1996 | Robinson et al. |
| 5,721,726 | A | 2/1998 | Kurnick et al. |
| 5,914,928 | A | 6/1999 | Takahashi et al. |
| 5,966,358 | A | 10/1999 | Mine |
| 5,999,505 | A | 12/1999 | Yasui |
| 6,272,085 | B1 | 8/2001 | Maeda |
| 6,292,625 | B1 * | 9/2001 | Gotoh et al. .......... 386/95 |
| 6,480,446 | B1 | 11/2002 | Ko |

FOREIGN PATENT DOCUMENTS

| JP | 02-139768 A | 5/1990 |
| JP | 04-028061 A | 1/1992 |
| JP | 06-103577 A | 4/1994 |
| JP | 07-254229 A | 10/1995 |
| JP | 09-282802 A | 10/1997 |
| JP | 10-1250096 A | 5/1998 |
| WO | WO-098/14839 A1 | 4/1998 |

* cited by examiner

*Primary Examiner*—William Korzuch
*Assistant Examiner*—Jorge L. Ortiz-Criado
(74) *Attorney, Agent, or Firm*—Birch, Stewart, Kolasch & Birch, LLP

(57) ABSTRACT

A defect area management system for an optical storage medium including a management part producing a defect area management signal for real-time processing and transmitting the signal along with data to be written; and a write part executing a defect area management of the optical storage media, writing the data, applied by the defect area management signal from the management part, into the optical storage medium so that whenever a light pickup meets a defect block at the time of writing data requiring the real-time processing into the optical storage medium, it does not have to be moved to the spare area, thus reducing the time it takes to move the light pickup and removing shortcomings of the real-time processing.

31 Claims, 6 Drawing Sheets

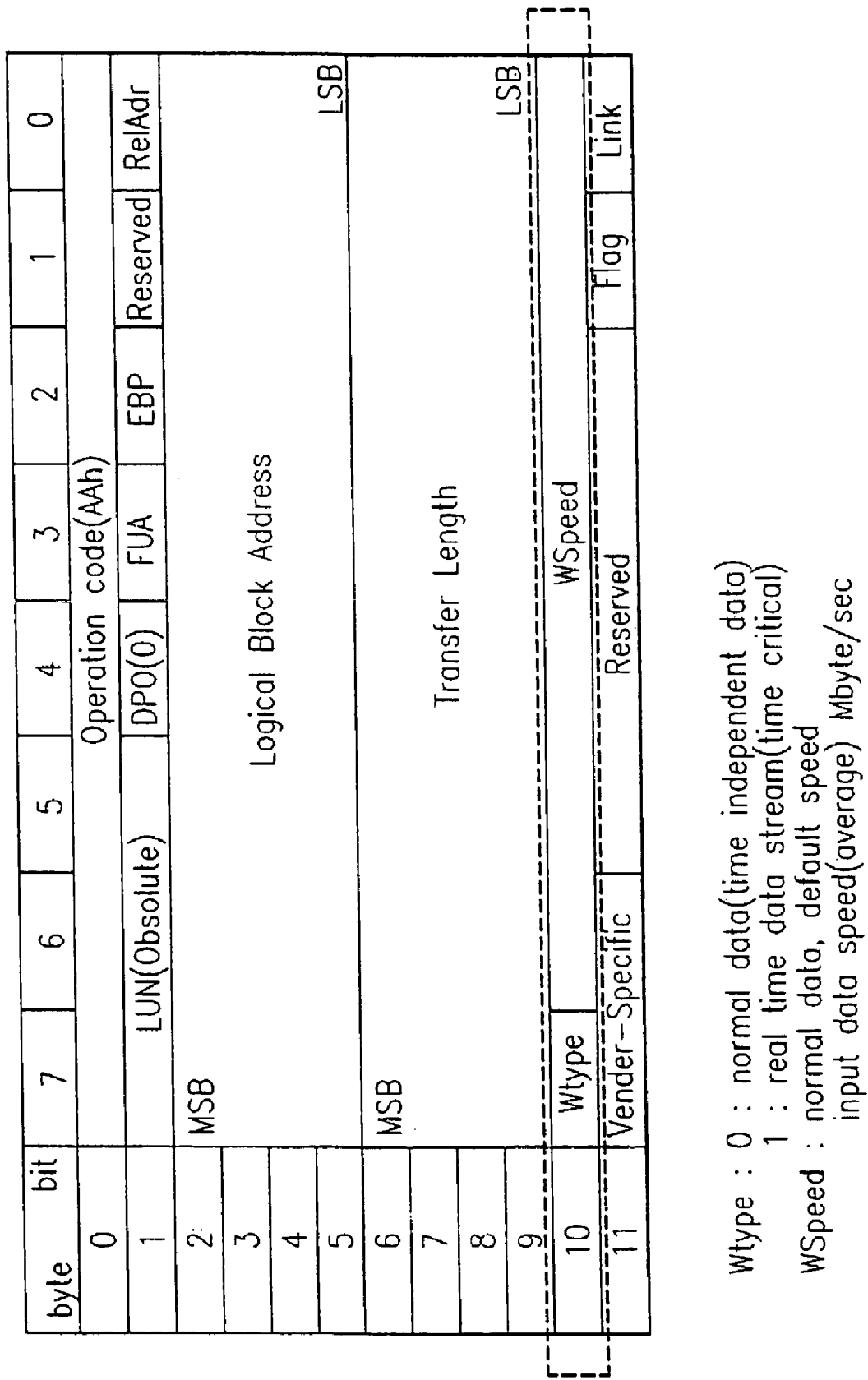

DEFECT AREA MANAGEMENT SYSTEM AND METHOD FOR OPTICAL STORAGE MEDIUM

This application is a Divisional of application Ser. No. 10/882,163, filed on Jul. 2, 2004, now U.S. Pat. No. 7,206,267, which is a Continuation of application Ser. No. 09/345,380 (now U.S. Pat. No. 6,771,575), filed on Jun. 30, 1999, and for which priority is claimed under 35 U.S.C. § 120; and this application claims priority of Application No. 10-1998-0026419 filed in Korea on Jul. 1, 1998 under 35 U.S.C. § 119; the entire contents of all are hereby incorporated by reference.

BACKGROUND OF THE INVENTION

1. Field of the Invention

The present invention relates to a rewritable optical storage system and more particularly to a defect area management system and method for an optical storage medium.

2. Discussion of Related Art

An optical storage media is generally divided into a read only memory (ROM), a write once read many (WORM) memory into which data can be written one time, and a rewritable memory into which data can be written several times. Rewritable optical storage media, i.e. optical discs, include rewritable compact discs (CD-RW) and rewritable digital versatile discs (DVD-RW, DVD-RAM, DVD+RW).

The operations of writing and playing back data in rewritable optical discs may be repeated. This repeated process alters the ratio of storage layers for writing data into the optical storage medium from the initial ratio. Thus, the optical discs lose its characteristics and generate an error during recoding/playback. This degradation is indicated as a defect area at the time of formatting, recording on or playing back from an optical storage medium.

Also, the rewritable optical disc may have a defect area due to a scratch on its surface, dirt and dust, or failure during manufacture. Therefore, in order to prevent writing into or reading out of the defect area, management of such defect areas is necessary.

FIG. 1 shows a defect management area (DMA) in a lead-in area and a lead-out area of the optical disc to manage a defect area. Particularly, the data area is divided into groups for the defect area management, where each group is further divided into a user area and a spare area. The user area is where data actually written and the spare area is used when a defect occurs in the user area.

Typically, one disc (e.g. DVD-RAM) has four DMAs, two in the lead-in area and two in the lead-out area. Since managing defect area is important, the same data are held in all four DMAs for data protection. Each DMA includes two blocks and consists of 32 sectors, wherein one block consists of 16 sectors. The first block (DDS/PDL block) of each DMA includes a disc definition structure (DDS) and a primary defect list (PDL), and the second block (SDL block) includes a secondary defect list (SDL).

More specifically, the PDL represents a primary defect data storage area, and the SDL represents a secondary defect data storage area. The PDL stores entries of all defective sectors generated during manufacture and identified during formatting such as initialization or re-initialization. Each entry includes a sector number corresponding to a defective sector and an entry type.

On the other hand, the SDL is arranged by blocks and holds entries of either defective areas which may be generated after initialization or defective areas which cannot be entered in the PDL during initialization. Each entry of the SDL includes an area storing the sector number of a first sector of the block having defective sectors, and an area holding the sector number of a first sector of a replacement block. Defective areas in the data area (i.e. defective sectors or defective blocks) are replaced with new sectors or blocks, respectively by skip defective area technique or linear replacement.

The skip defective area technique is utilized when a defective area or sector is recorded in the PDL. As shown in FIG. 2A, if defective sectors m and n, corresponding to sectors in the user area, are recorded in the PDL, such defective sectors are skipped to the next available sector. By replacing the defective sectors by subsequent sectors, data is written to a normal sector. As a result, the user area into which data is written slips and occupies the spare area in the amount equivalent to the skipped defective sectors.

The linear replacement is utilized when a defective area or block is recorded in the SDL. As shown in FIG. 2B, if defective blocks m and n, corresponding to blocks in either the user or spare area, are recorded on the SDL, such defective blocks are replaced by normal blocks in the spare area and the data to be recorded in the defective block are recorded in an assigned spare area. To achieve the replacement, a physical sector number (PSN) assigned to a defective block remains, while a logical sector number (LSN) is moved to the replacement block along with the data to be recorded. Linear replacement is effective for non real-time processing of data.

FIG. 3 is a partial diagram of an optical disc recording/playback (R/P) device relating to the write operation. The optical disc (R/P) device includes an optical pickup to write data into and playback data from the optical disc; a pickup controller transferring or moving the optical pickup; a data processor either processing and transferring the input data to the optical pickup, or receiving and processing the data reproduced through the optical pickup; an interface; and a micro processor (micom) controlling the components.

Also, a host may be connected to the interface of the optical disc R/P device to transfer commands and data to and from each other. Such host can be any kind of personal computer, and would manage the optical disc R/P device. FIG. 4 shows an optical R/P method.

Referring to FIG. 4, if there is data to be written (Step 401), the host sends both the data to be written and a write command to the optical disc R/P device (Step 402). The write command includes a logical block address (LBA) which designates a write position, and a transfer length which indicates the size of the data to be written.

Upon receiving the data, the optical disc R/P device begins to write the data into a corresponding LBA of the optical disc (Step 403). The optical disc R/P device does not write data into defective areas by utilizing the PDL and SDL, which show defective areas of the optical disc. Thus, the write operation is performed by skipping the physical sector recorded in the PDL or replacing the physical block recorded in the SDL with an assigned block in the spare area.

When the optical disc R/P device completes writing the received data, the optical disc R/P device informs the host of the completion by transferring a write completion signal (Step 403). The host then monitors whether the write command was well executed (Step 404). Finally, the optical disc R/P device sends (Step 405) a command execution report to the host, and the host terminates the data write operation on receipt of the report (Step 406).

However, the above conventional technique has several problems. Because both skipping and linear replacement are utilized, when a defective block is found during data write operation, the defective block may be replaced by an assigned block in the spare area. As a result, the optical pickup must be transferred to the spare area and retransferred back to the user area in order to continue writing the data. The time to transfer and retransfer the optical pickup may become a significant problem in a real-time processing.

Therefore, application of the conventional technique described above would not be effective when real-time writing is required, such as for audio-visual (A/V) use, because of its uniform defect area management.

SUMMARY OF THE INVENTION

Accordingly, an object of the present invention is to solve at least the problems and disadvantages of the related art.

An object of the present invention is to provide a defect area management system with an improved real-time writing for an optical storage medium.

Another object of the present invention is to provide a defect area management system and method for an optical storage medium which generates a write command for real-time processing if there is data for real-time processing and manages defective areas of an optical disc.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a defect area management system for an optical storage medium including a management unit (or host) producing a defect area management signal for real-time processing and transmitting the signal with data to be written; and a write unit (or an optical disc R/P device) executing a defect area management of the optical storage media, and writing the data into the optical storage medium according to the defect area management signal.

In the present invention, the management unit determines whether to output a defect area management signal for real-time processing based upon the input data. The defect area management signal from the management unit is a command prohibiting execution of a linear replacement. Thus, upon receiving the defect area management signal, the write unit writes the input data into an optical disc utilizing the skipping replacement.

A method of managing defective areas of an optical storage medium according to the present invention includes producing a defect area management signal for real-time processing and transmitting the signal with the data to be written, if a real-time processing is required; and executing a defect area management of the optical storage medium and writing the input data into the optical storage medium according to the defect area management signal.

The defect area management includes transmitting data to be written after generating a real-time write command; detecting the volume of data which has not been written during the execution of the real-time write command based upon receipt of information stored in the optical storage medium; and if there is either unwritten data or successively connected data, repeating the step of generating the real-time write command to continue writing. The volume of the unwritten data is detected by utilizing the information of defective blocks which were skipped when writing data into the optical storage medium.

The defect area management signal is a command prohibiting an execution of linear replacement. The defect area management signal includes identification information which indicates real-time data. The step of writing the data into the optical storage medium includes writing the input data according to the real-time write command. If a defective block is found during the writing process, data is written into a following normal block, skipping the defective block.

When writing the data is completed, the information of the defective blocks skipped during the writing is transferred and stored in the optical storage medium. The information of the defective blocks skipped to write data on a following normal block during the data writing is recorded in SDL entries.

According to another embodiment of the present invention, a method of managing defective areas of an optical storage medium with a defect management area includes producing information about the characteristics of data to be written, and transmitting such information with the data to be written; and executing a defective area management of the optical storage medium and writing the input data into the optical storage medium by using the characteristic information of the data.

The characteristic information of the data includes identification information indicating real-time data, and speed information of the input data. While data is written into the optical storage medium, if a defective block is found, data is either written into a normal block following the defective block or written in to a replacement block based upon the characteristic information of the data.

BRIEF DESCRIPTION OF THE ATTACHED DRAWINGS

The invention will be described in detail with reference to the following drawings in which like reference numerals refer to like elements wherein:

FIG. 6 shows an initialization of a write command for real-time processing in accordance with the present invention.

DETAILED DESCRIPTION OF PREFERRED EMBODIMENTS

Figure 1:
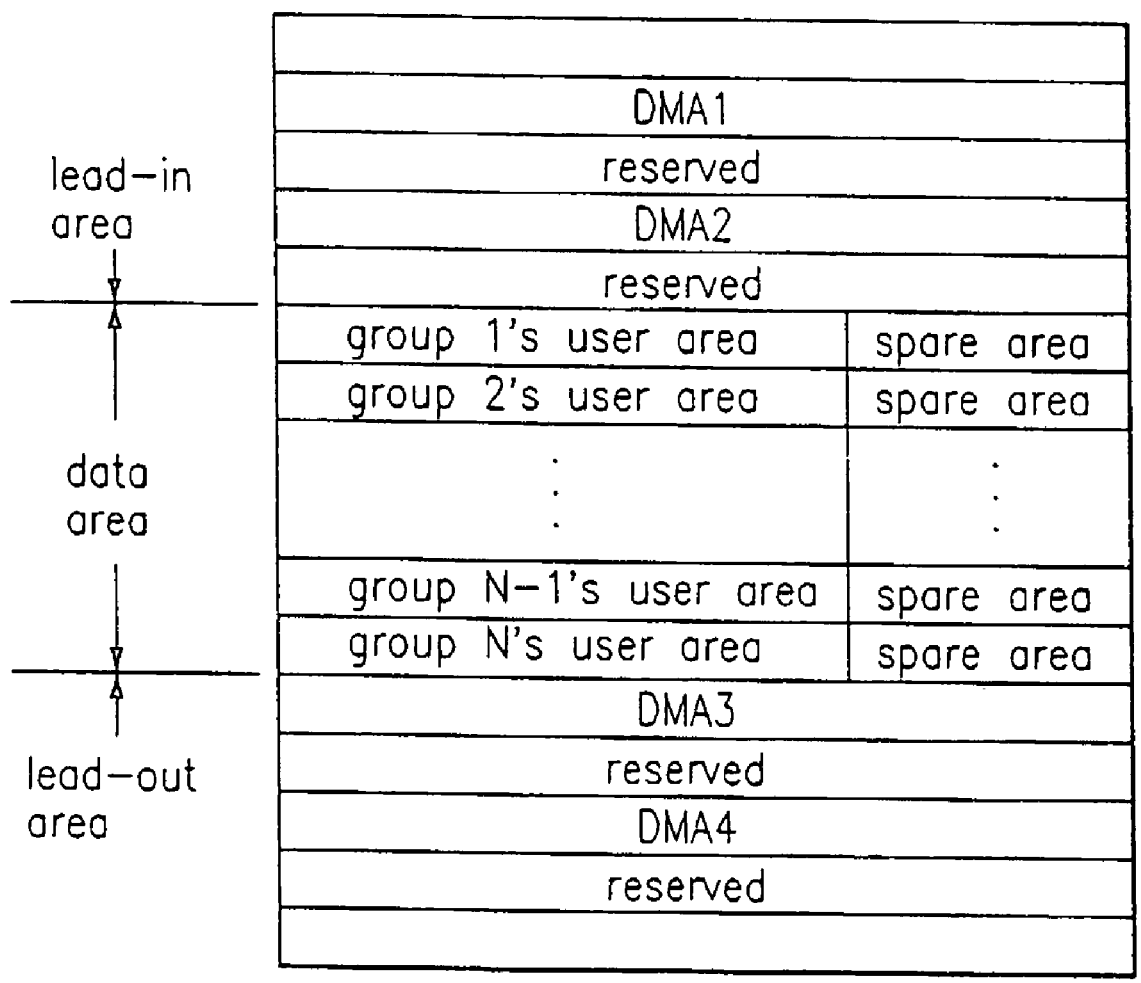
FIG. 1 is a structure of a conventional optical disc in the related art.
Figure 2A:
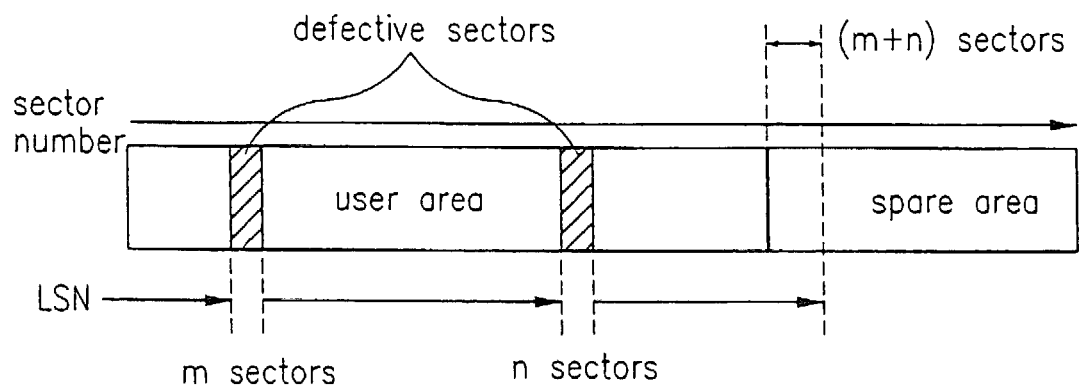
FIG. 2A shows a skipping defective area technique in the related art.
Figure 2B:
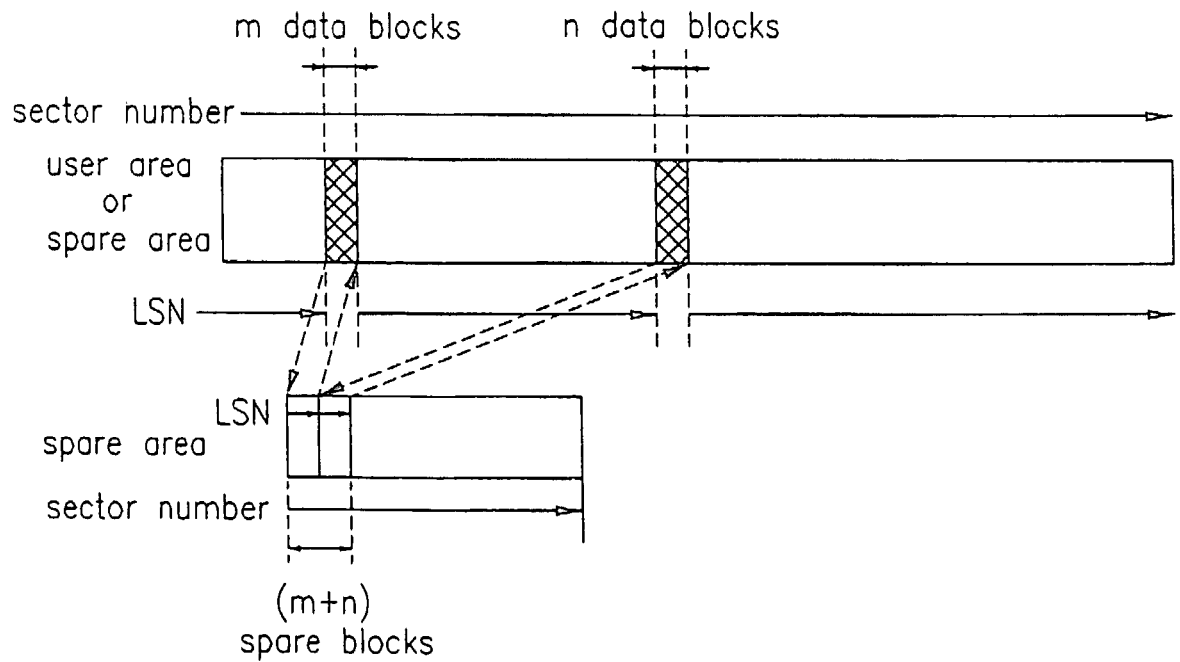
FIG. 2B shows a linear replacement technique in the related art.
Figure 3:
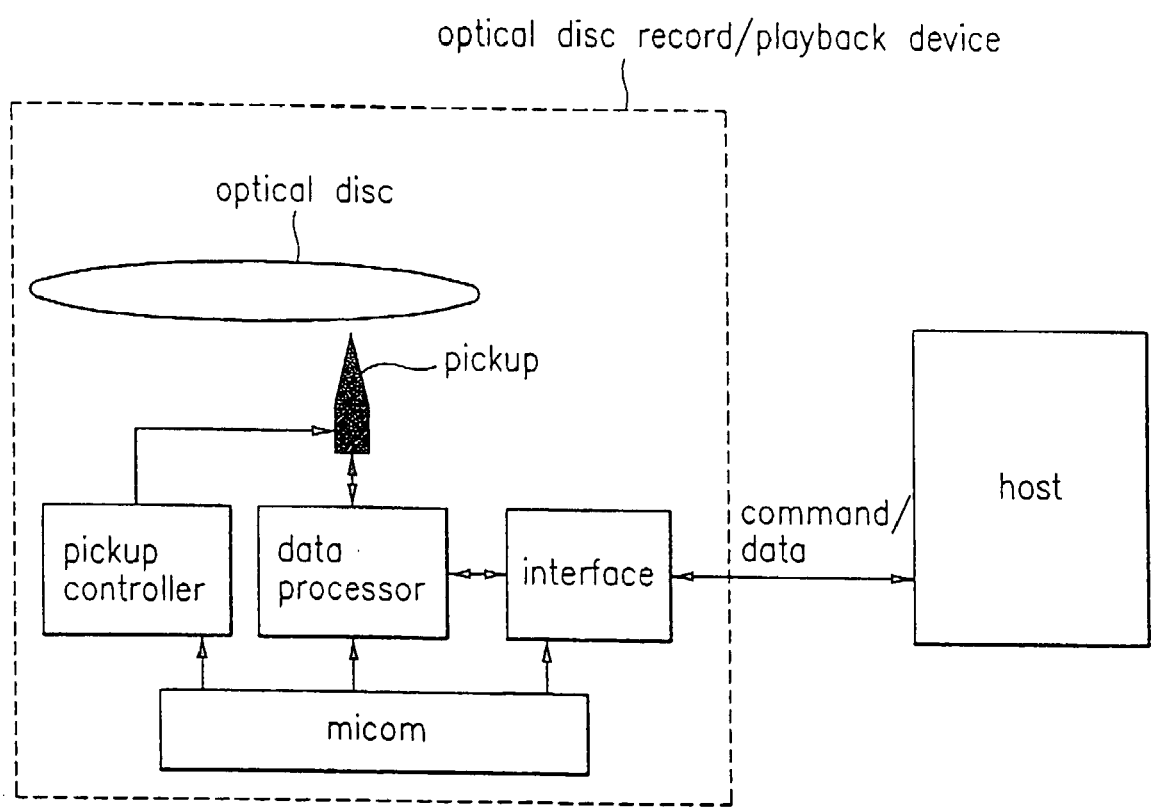
FIG. 3 is a block diagram of a conventional disc R/P device in the related art.
Figure 4:
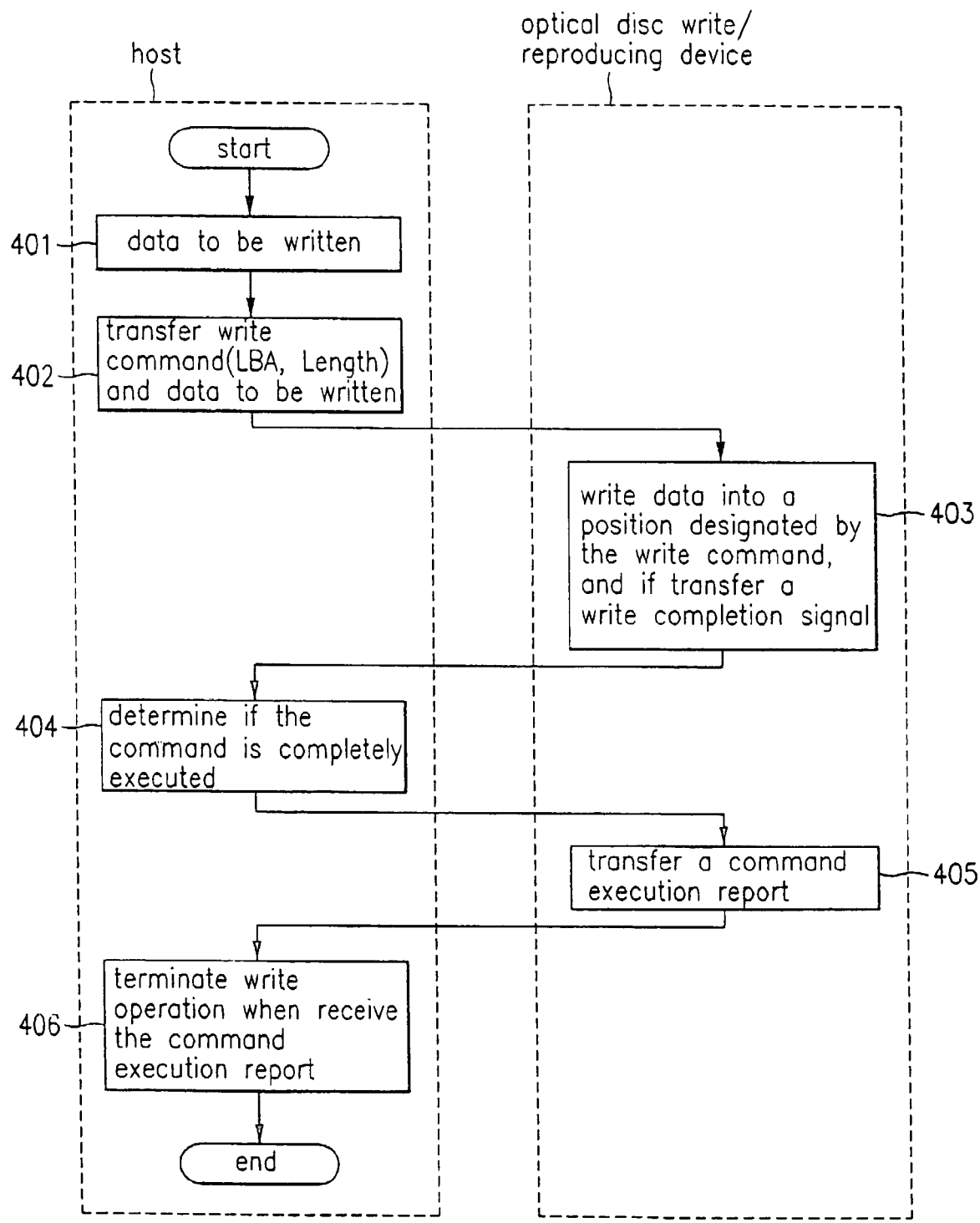
FIG. 4 is a control sequence of defect area management for an optical disc in accordance with the related art.
Figure 5:
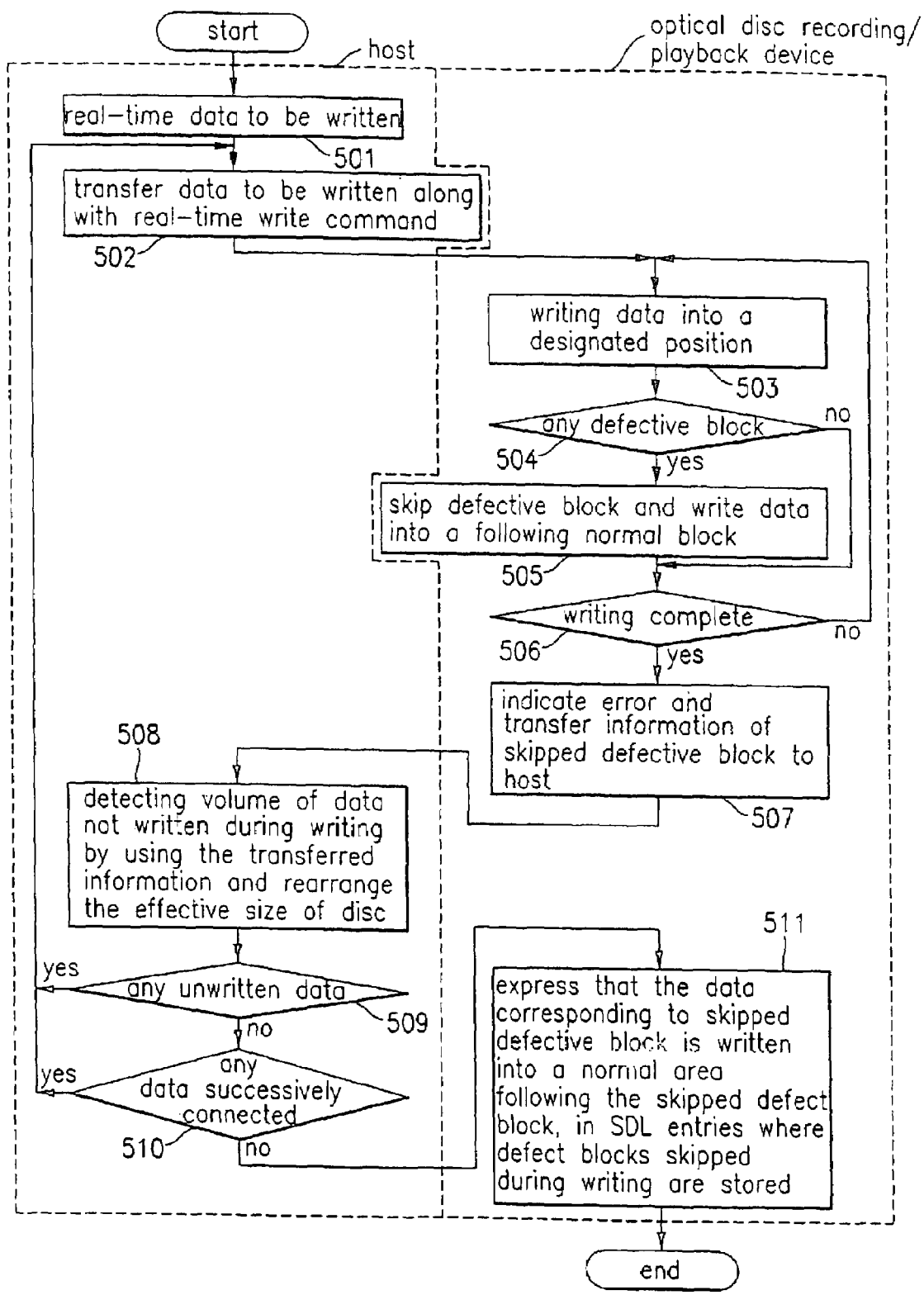
FIG. 5 is a control sequence of defect area management for an optical disc in accordance with the present invention.

Reference will now be made in detail to the preferred embodiments of the present invention, examples of which are illustrated in the accompanying drawings. FIG. 5 is the control sequence of defect area management for an optical disc in accordance with the present invention, and shows the operation of an optical disc R/P device with a host.

To improve real time processing of data, maintaining compatibility with the conventional command system would be preferable. Accordingly, the present invention further adds a data flag for real-time processing to the conventional command system. As a result, if a defective block is found during a write command for real-time processing, the defective block is skipped rather than replaced.

FIG. 6 shows a preferred embodiment of the present invention. Generally a conventional write command of 12 bytes for writing data into an optical disc by skipping defective blocks during writing or playback is altered in the present invention. More specifically, a reserved area of the write command (the 10th byte) includes a flag indicating the type of data to be written (Wtype). The reserved area may also include information indicating the speed of the data to be written (Wspeed). Such information would be used by discs which have capability to support the flags.

For example, when normal data which does not need real-time writing is input, Wtype flag is set to 0. However, when data requiring real-time processing is input, Wtype flag is set to 1, thereby informing the optical disc R/P device that the data requires real-time processing.

Accordingly, if the Wtype flag within the transferred write command is set to 1, the optical disc R/P device skips a defective block during writing or playback rather than replacing the defective block. Thus, the input data is written into a normal block following the defective block. When the input data does not require real-time processing, the Wtype flag is reset to 0 and the optical disc R/P device allows linear replacement whereby data is written into the spare area.

Also, the Wspeed flag may be set according to the required write speed of the input data and transferred within the write command. The optical disc R/P device determines whether to execute linear replacement by utilizing the Wspeed. Particularly, the speed of data transferred from the host to the optical disc R/P device is recorded into the Wspeed area. The optical disc R/P device then compares the recorded speed of the data transfer with the speed by which the data is being written into the optical disc to determine whether to allow linear replalcement.

If the transfer speed of data from the host is close to the writing speed of the data into the optical disc, execution of linear replacement slows down the writing of data, thereby reducing the speed of data transfer and increasing the data transfer time. On the other hand, if the transfer speed is significantly slower than the writing speed, slowing down the writing of data would not affect the data transfer time. Accordingly, when the transfer speed is lower than the writing speed by a predetermined amount, linear replacement is executed, except when real-time processing is required.

The host may determine and control whether to execute linear replacement utilizing the Wtype flag, and/or the optical disc R/P device may determine whether to execute linear replacement utilizing both the Wtype flag and Wspeed.

Referring to FIG. 5, if data to be written in real time, such as digital TV stream data or camcorder data, is input (Step 501), the host generates a real-time write command and sets the Wtype flag to 1. The host then transfers both the data to be written and the write command to the optical disc R/P device (Step 502) through the interface.

Upon receiving the real-time write command, the optical disc R/P device processes the transferred data together with the write command, and writes the data into a designated position (Step 503). The position of the optical disc into which the data is written may be designated using the LBA or may be specified in advance using another command.

The optical disc R/P device determines whether defective areas exist utilizing the PDL and SDL which indicate the defective areas in the optical disc. If a defective block recorded in the SDL is found during the writing of data (Step 504), the optical disc R/P device checks the Wtype flag within the write command. Since the write command is for real-time processing, the Wtype flag would be set to 1.

When the Wtype flag is set to 1, the optical disc R/P device skips the defective block and writes the data into a normal block following the defective block (Step 505). Upon completion of writing the data (Step 506), the optical disc R/P device sends a report back to the host. In the preferred embodiment, if the host requires a current progress during the writing of data, the optical disc R/P device transfers the required information to the host. If there is no request from the host during writing of data, the optical disc R/P device sends a report to the host after data writing is completed.

Accordingly, if the optical disc R/P device determines that the writing of data is completed, it monitors whether there are any R/P defective blocks. A difference exists between the transfer length used by the host to write the real-time data and the actual size of data to be written due to the number of SDL entries skipped during the writing of the data. Thus, if there is at least one skipped defective block, the optical disc R/P device indicates an error and transfers the information of skipped defective blocks to the host (Step 507).

The host monitors whether the optical disc R/P device has appropriately executed the write command and detects the volume of data which had not been written by the real-time write command of Step 502, based upon the received report. Namely, the report includes information such as the number of defective blocks, i.e. the number of SDL entries, skipped during the writing.

The host takes into consideration the number of SDL entries in the next write command. Particularly, the host varies the volume of data to be written in the next write command, in response to the number of SDL entries skipped during the writing. Because the skipped defective blocks cannot be used, the effective size of the disc must be rearranged based upon the skipped defective blocks (Step 508).

If there is either data which could not be written into the designated position of the optical disc due to the skipped defective blocks (Step 509) or continuing data successively connected by the real-time write command (Step 510), the host returns to Step 502 and repeats transferring the real-time write command. If there is no further data to be written or continuing data in Steps 509 and 510, the writing process ends.

However, in the preferred embodiment, if there is no further data to be written or continuing data, the optical disc R/P device moves to the DMA area and indicates in the SDL entries where the skipped defective blocks were registered during the recording, that the data corresponding to the defective blocks has been recorded by skipping the defective blocks. Thus, during playback of the data, the optical pickup need not move to the spare area, but to the normal block following a defective block when a defective block is found through the SDL.

Furthermore, if Wspeed has been set in the write command when a defective block is found in Step 504, a determination whether to allow and execute a linear replacement for data can be made utilizing Wspeed. Particularly, the optical disc R/P device compares the speed of Wspeed to the actual speed at which the data is being written into the optical disc. If a linear replacement would not affect the writing of data, i.e. writing speed faster than the transfer speed, the linear replacement is executed and data corresponding to defective blocks are written into a replacement block in the spare area. If a linear replacement would detrimentally slow down the real-time writing, i.e. writing speed is slightly higher than the transfer speed, a skip defective area technique is executed and data corresponding to defective blocks are written into normal blocks following the defective blocks.

As described above, in the present invention, when data requiring a real-time processing is generated, a real-time write command is sent by which a defective block is skipped and the data corresponding to the defective block is written in a normal block following the defective block. As a result, the optical pickup does not need to move to the spare area whenever a defective block is found, thereby reducing the time it takes the optical pickup to move to and from the spare area. Thus, the present invention improves a real-time processing of data in the optical disc R/P device.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for managing a defective area on a recording medium, the recording medium including a defect management area including a defect management information, which indicates a position of a defective area, comprising the steps of:
    (a) receiving a command for data writing with data to be written, the command including an LBA (Logical Block Address) for designating a position for the data to be written, a transfer length for indicating an amount of the data to be written, and a write type information to identify whether or not the data is real time data;
    (b) controlling a write operation based on the command such that a defective block is skipped and a data is recorded in a next normal block, when the write type information identifies real time data; and
    (c) recording a defect management information in the defect management area to indicate that the data corresponding to the skipped defective block is recorded in the next normal block.

2. The method of claim 1, further comprising:
    (d) outputting a signal to indicate that there is a skipped defective block during real time writing.

3. The method of claim 2, wherein the step (d) further outputs a number of the skipped defective blocks.

4. The method of claim 1, wherein the step (c) further records a position of the skipped defective block.

5. The method of claim 1, wherein in the step (b), a write operation is controlled such that a linear replacement for a defective area of the recording medium is performed when the write type information identifies non-real time data.

6. A method for managing a defective area on a recording medium, the recording medium including a defect management area including a defect management information, which indicates a position of a defective area, comprising the steps of:
    (a) receiving a command for data writing with data to be written, the command including a write type information to indicate whether or not the data is real time data;
    (b) controlling a write operation based on the command such that a defective block is skipped and a data is recorded in a next normal block, when the write type information indicates real time data; and
    (c) recording a defect management information in the defect management area to indicate a position of the next normal block.

7. The method of claim 6, wherein the step (c) further records a position of the skipped defective block.

8. The method of claim 6, wherein the command further includes an LBA (Logical Block Address) for designating a position to be written, and a transfer length for indicating an amount of data to be written.

9. The method of claim 6, wherein in the step (b), a write operation is controlled such that a linear replacement for a defective area of the recording medium is performed when the write type information identifies non-real time data.

10. The method of claim 6 further comprising:
    (d) outputting a signal to indicate that there is a skipped defective block during real time writing.

11. The method of claim 10, wherein the step (d) further outputs a number of the skipped defective blocks.

12. A method for managing a defective area on a recording medium, the recording medium including a defect management area including a defect management information, which indicates a position of a defective area, comprising the steps of:
    (a) receiving a command for writing with data to be written, the command including a write type information to identify whether or not the data is real time data;
    (b) controlling a write operation based on the command such that a defective block is skipped and a data is recorded in a next normal block, when the write command indicates real time data; and
    (c) recording a defect management information in the defect management area to indicate that the defective block is skipped and the data is recorded in the next normal block.

13. The method of claim 12, wherein the step (c) further records a position of the skipped defective block.

14. The method of claim 12, wherein in the step (b), a write operation is controlled such that a linear replacement for a defective area of the recording medium is performed when the write type information identifies non-real time data.

15. The method of claim 12, wherein the command further includes an LBA (Logical Block Address) for designating a position to be written, and a transfer length for indicating an amount of data to be written.

16. The method of claim 12, further comprising:
    (d) outputting a signal to indicate that there is the skipped defective block during real time writing.

17. The method of claim 16, wherein the step (d) further outputs a number of the skipped defective blocks.

18. A method for managing a defective area on a recording medium, the recording medium including a defect management area including a defect management information, which indicates a position of a defective area, comprising the steps of:
    (a) receiving a command for data writing with data to be written, the command including a write type information to identify whether or not the data is real time data;
    (b) controlling a write operation based on the command such that a defective block is skipped and a data is recorded in a next normal block, when the write command indicates real time data;

(c) reporting an information of the skipped defective block when the write operation of the real time data is terminated; and (d) recording a defect management information in the defect management area to indicate that the data corresponding to the skipped defective block is recorded into the next normal block.

19. The method of claim 18, wherein the step (d) further records a position of the skipped defective block.

20. The method of claim 18, wherein in the step (b), a write operation is controlled such that a linear replacement for a defective area of the recording medium is performed when the write type information identifies non-real time data.

21. The method of claim 18, wherein the command further includes an LBA (Logical Block Address) for designating a position to be written, and a transfer length for indicating an amount of data to be written.

22. A method for managing a defective area on a recording medium, the recording medium including a defect management area including a defect management information, which indicates a position of a defective area, comprising the steps of:

(a) receiving a command for real time writing with data to be written, the command including an LBA (Logical Block Address) for designating a position to be written, a transfer length for indicating an amount of data to be written, and a write type information for identifying real time writing;

(b) controlling a write operation based on the command such that a defective block is skipped and the data is recorded in a next normal block; and (c) updating the defect management information in the defect management area to indicate that the defective block is skipped and the data is recorded in the next normal block.

23. The method of claim 22, further comprising:

(d) outputting a signal to indicate that there is a skipped defective block during the real time writing.

24. The method of claim 23, wherein the step (d) further outputs a number of the skipped defective blocks.

25. The method of claim 22 wherein the step (d) further records a position of the skipped defective block.

26. An apparatus for recording data on a recording medium including a defect management area including a defect management information, comprising:

a controller for receiving a command including a write type information to indicate whether or not data to be written is real time data, and controlling a write operation based on the received command such that a defective block is skipped and a data is recorded in a next normal block, when the command indicates the real time data; and a recording unit for recording the real time data and the defect management information to indicate that the defective block is skipped and the data is recorded in the next normal block, on the recording medium.

27. The apparatus of claim 26, wherein the defect management information includes a position of the skipped defective block.

28. The apparatus of claim 26, wherein the controller controls the write operation such that a linear replacement for the defective area of the recording medium is performed when the write type information identifies, non-real time data.

29. The apparatus of claim 26, wherein the command further includes a LBA (Logical Block Address) for designating a position to be written, and a transfer length for indicating an amount of data to be written.

30. The apparatus of claim 26, further comprising:

outputting a signal to indicate that there is the skipped defective block during real time writing.

31. The apparatus of claim 30, wherein the outputted signal further indicates a number of the skipped defective blocks.

* * * * *